(12) United States Patent
Lee

(10) Patent No.: US 7,268,943 B2
(45) Date of Patent: Sep. 11, 2007

(54) 3D DISPLAY APPARATUS

(75) Inventor: Sung-Jung Lee, Seoul (KR)

(73) Assignee: Pavonine Inc., Incheon (KR)

( * ) Notice: Subject to any disclaimer, the term of this patent is extended or adjusted under 35 U.S.C. 154(b) by 237 days.

(21) Appl. No.: 10/995,152

(22) Filed: Nov. 24, 2004

(65) Prior Publication Data
US 2005/0117216 A1 Jun. 2, 2005

(30) Foreign Application Priority Data
Nov. 29, 2003 (KR) ........................ 10-2003-0085907

(51) Int. Cl.
*G02B 27/22* (2006.01)
*H04N 9/47* (2006.01)
(52) U.S. Cl. .................... 359/464; 359/462; 348/56
(58) Field of Classification Search ................ 359/494, 359/464, 462; 348/51, 56; 349/122; 428/162
See application file for complete search history.

(56) References Cited

U.S. PATENT DOCUMENTS 5,315,377 A * 5/1994 Isono et al. .................. 348/51
6,055,103 A * 4/2000 Woodgate et al. .......... 359/494
6,094,216 A * 7/2000 Taniguchi et al. ............ 348/51
6,147,738 A * 11/2000 Okamoto ..................... 349/122
6,271,896 B2 * 8/2001 Moseley et al. .............. 349/15
6,465,077 B1 * 10/2002 Lee et al. .................... 428/167

* cited by examiner

*Primary Examiner*—Audrey Chang
(74) *Attorney, Agent, or Firm*—IPLA P.A.; James E. Bame

(57) ABSTRACT

The present invention relates to a 3D image display apparatus of a parallax barrier method. In the 3D image display apparatus of a parallax barrier method, a parallax barrier of which a transparent slit portion is formed in a tooth shape is adapted, so that it is possible to decrease an optical bad feeling due to Moire pattern. When designing the pitch S of the parallax barrier, in the case that the parallax barrier is disposed behind the image panel the pitch S is S=2Pk(V+D)/V, and in the case that the parallax barrier is disposed in front of the image panel, the pitch S is S=2Ph(V−D)/V. In the 3D image reproducing apparatus according to the present invention, an excellent performance can be achieved as compared to the simple 3D image. The common image can be easily converted into a 3D image using an on and off operation using the electronic shutter.

4 Claims, 7 Drawing Sheets

PRIOR ART

PRIOR ART

PRIOR ART

PRIOR ART

PRIOR ART

3D DISPLAY APPARATUS

BACKGROUND OF THE INVENTION

1. Field of the Invention

The present invention relates to a 3-dimensonal display apparatus, and in particular to a 3D display apparatus and a method for optimizing the same.

2. Description of the Background Art

Generally, a 3D image capable of expressing 3 dimensions is obtained based on a remote distance of a stereo visibility using two eyes. Since two eyes are distanced by about 65 mm, a difference distance between two eyes is the most important factor in 3D images.

The left and right eyes see different 2D images, respectively. When two images are transferred to a brain through a retina, the brain recognizes the images for thereby reproducing the depth and actuality of a 3D image In a method for viewing a 3D image, there are a glasses-wearing method and a non-glasses wearing method based on the use of glasses by a viewer.

The method of using glasses may be classified into an anaglyph method in which blue glasses and red glasses are worn, a density difference method for obtaining a 3D feeling by installing a filter having different transmittances at left and right glasses, a polarized glasses method of using polarized glasses having different polarizing directions, and a time division method of periodically repeating a time-divided image wherein a LCD shutter is installed in synchronization with the period. However, the method of using the glasses may cause inconveniences. In addition, there are some problems when viewing other objects except for the 3D image in a state that the glasses are worn.

Therefore, recently, the non-glasses method has been widely studied. Various applications have been developed. As representative methods of the non-glasses method that does not use glasses, there are a lenticular lens method that a lenticular lens plate is installed in front of an image panel wherein a cylindrical lens array is vertically arranged, and a parallax barrier method.

FIG. 1 is a view for describing a parallax barrier method; FIGS. 2A and 2B are views for describing a pitch computation formula of a parallax barrier; FIGS. 3A, 3B and 3C are views illustrating parallax barrier patterns in a conventional art; and FIG. 4 is a cross sectional view illustrating an assembling of a parallax barrier method in a conventional art.

As shown in FIG. 1, a parallax barrier 30 is installed in front of an image panel 20 wherein a transparent slit and a non-transparent portion are repeatedly arranged in the parallax barrier 30.

A viewer 10 views an image displayed on the image panel 20 through the transparent slit of the parallax barrier 30. The left and right eyes of the viewer 10 view other regions of the image panel 20 even when the eyes see through the same transparent slit. Namely, the left eye can see only L, L, L, L, L, . . . in the visible region 14 of the left eye, and the right eye can see only R, R, R, R, R, . . . in the visible region 14.

The parallax method is directed to using the above principle. Namely, in the parallax method, it is possible to view the images corresponding to the sub-pixels of other regions viewed through the transparent slit by the left and right eyes for thereby feeling a 3D effect. However, the conventional art may give a viewer a bad feeling to the viewer's eyes since a Newton ring phenomenon occurs.

As shown in FIG. 2A, the parallax barrier 30 is installed behind the image panel 20 at a certain distance D. The transparent slit is installed at an intermediate boundary portion of two sub-pixels R and L of the image panel 20. Therefore, the image of the sub-pixels R and L of the image panel 20 are shown at the position V through the transparent slit. When the image corresponding to the left and right eyes of the viewer are displayed on the image panel 20, the viewer can see the 3D image.

As shown in FIG. 2A, the parallax barrier 30 is positioned behind the image panel 20 in the parallax barrier method. At this time, the pitch S between the slits is computed based on the Equation $S=2P(V+D)$ - - - (1) in the conventional art.

Here, S represents the slit pitch in the horizontal direction, and P represents the pitch of the sub-pixels R and L in the horizontal direction, and V represents the distance from the sub-pixels R and L and the viewer, and D represents a distance from the sub-pixels R and L to the parallax barrier 30.

As shown in FIG. 2B, the parallax barrier 30 is positioned in front of the image panel 20 in the parallax barrier method. The pitch S between the slits is computed based on the Equation $S=2P(V-D)/V$ - - - (2).

However, when the Equations (1) and (2) are actually adapted to the products, there is a certain limit for developing and fabricating the optimized 3D products. Therefore, the equations need a certain supplement.

Namely, it is not optimized with the Equations (1) and (2) by the following reasons. First, only the straight property of light is considered. Second, the diffraction of light is not considered. Third, since the distances between the pixels of each element of the image panel 20 and the viewer 10 are different, the pitch S between the transparent slits should have a small difference.

In order to overcome the above problems, the tests are actually performed. As a result of the test, it is known that the common Equation of $S=2P(V+D)/V$ should be changed to the Equation of $S=2Pk(V+D)/V$. In addition, it is known that the conventional common Equation of $S=2P(V-D)/V$ should be changed to the Equation of $S=2Ph(V-D)V$. Here, k represents the value of a range of $0.98<k<1.00$, and h represents the value of a range of $1.00<h<1.02$. Therefore, it is possible to see the optimized 3D image.

Generally, it is recommended that the parallax barrier pattern should be designed with a width below ⅓ of the pixel with a straight transparent slit. In this case, the ghost is slightly decreased, but the brightness of the 3D image is decreased, and the dark Moire pattern appears in the vertical direction, so that the viewer may have a bad feeling.

FIG. 3A is a view illustrating the parallax barrier pattern in a conventional art. When an electrical signal is applied to the signal line 28, the non-transparent portion 32 gets darkened, and the rectangular transparent portion 34 operates as the slit. When the rectangular transparent portion 34 is adapted to the image panel 20, and the 3D image is viewed, the dark Moire pattern in the vertical direction as well as the dark Moire pattern in the horizontal direction appear, so that the viewer may have a bad feeling.

FIG. 3B is a view illustrating the parallax barrier pattern in another conventional art. When the pattern of the circular transparent part 36 is adapted to the image panel 20, and the 3D image is viewed, the light transmittance is decreased, and the dark Moire pattern in the vertical direction as well as the dark Moire pattern in the horizontal direction appear, so that the viewer may have a bad feeling.

FIG. 3C is a view illustrating another parallax barrier pattern in a conventional art. When the pattern of the rectangular transparent part 37 is adapted to the 3D image, and the 3D image is viewed, the light transmittance is increased, and the dark Moire pattern appears in the vertical direction. In addition, the light intensity distribution in the horizontal direction of the Moire pattern appears in a step shape and a dim rainbow shape, so that the viewer may have a bad feeling.

FIG. 4 is a cross sectional view illustrating an assembling of a conventional parallax barrier method. In the case that the parallax barrier 30 is a conventional electronic shutter 31, the image of the image panel 20 may be discolored due to the electronic shutter 31 based on the optical characteristic with the image panel 20. In order to overcome the above problem, a ¼ phase plate 25 may be attached. In addition, the polarized film 24 attached on the surface of the image panel 20 is processed with the surface reflection prevention, and a micro curve is formed on the surface of the same for thereby scattering light. Therefore, there is a big problem for viewing the 3D image.

In order to concurrently overcome the above problems, a ¼ phase plate 25 is attached. In this case, the cost of the ¼ phase plate 25 is high. When it is attached on the image panel 20, it is needed to accurately arrange the angle of the ¼ phase plate 25. In addition, in the case that the conventional electronic shutter 31 is attached on the image panel 20, when the surface of the ¼ phase plate 25 attached on the image panel 20 gets closer to the surface of the polarized film 23 of the rear surface of the conventional electronic shutter 31, a Newton ring phenomenon occurs. Therefore, the viewer may have a bad feeling.

SUMMARY OF THE INVENTION

Accordingly, it is an object of the present invention to overcome the above-described problems encountered in the conventional art.

It is another object of the present invention to provide a 3D image display apparatus capable of decreasing an optical bad feeling due to a Moire pattern by adapting a parallax barrier of which a transparent slit portion of a parallax barrier type is formed in a tooth shape, and capable of obtaining an optimized 3D image by adapting a new formula when computing a pitch of a parallax barrier. In addition, it is possible to easily convert a common image and a 3D image by adapting an electronic shutter and achieving an on and off operation.

To achieve the above objects, in a 3-dimensional (3D) image display apparatus capable of easily viewing a common image and a 3D image in such a manner that there are provided an image panel, and a parallax barrier of which a transparent slit is formed in a tooth shape wherein an electronic shutter type parallax barrier is fabricated in a shape of the parallax barrier for thereby achieving an on and off operation, wherein a ¼ phase plate is provided between the parallax barrier and the image panel for thereby preventing a change of colors, there is provided a 3D display apparatus that is characterized in that the front polarized film of the image panel is shared, and a TAC film is attached on the image panel for thereby preventing scattering of light from the image panel, and a microsphere layer is coated on the surface of the TAC film for preventing a Newton ring phenomenon, and in the case that the parallax barrier is provided behind the image panel, the pitch of the parallax barrier is $S=2Pk(V+D)/V$, and in the case that the parallax barrier is provided in front of the image panel, the pitch of the same is $S=2Ph(V-D)/V$ where S is a slit pitch in a horizontal direction, and P is a pitch of sub-pixels R and L in a horizontal direction, and V is a distance from the sub-pixels R and L to a viewer, and D is a distance from the sub-pixels R and L to the parallax barrier, and k is a constant value having a range of $0.98<k<1.00$, and h is a constant value having a range of $1.00<h<1.02$.

In addition, the transparent slit of the parallax barrier is formed in a tooth shape in order to decrease an optical bad feeling due to a Moire pattern and enhance the performance of a 3D apparatus wherein the angle A in the tooth shape is $10~15°$ with respect to a vertical line, and it is symmetrical in the upper and lower directions, and the width of the transparent slit is about ½ of the pitch S, and the pitch of the transparent portion in the upper and lower directions is about ½ of the pitch S in the left and right directions.

The transparent slit is designed in a tooth shape, and the width of the opening is widened over 45% of two pitches of the corresponding pixels.

Here, in the 3D technology of the parallax barrier method, the parallax barrier having a plurality of transparent slits of a certain period is attached at a front side of the image panel in a vertical direction at a certain distance. Here, when viewing the images through the parallax barrier that is fabricated in such a manner that an image viewed by a right eye appears in the row of the odd number sub-pixel in the horizontal direction of the image panel, and an image viewed by a left eye appears in the row of the even number sub-pixel, and one vertical arranged transparent slit row is arranged to correspond with two sub-pixel rows, the left eye of the viewer can see the even number sub-pixel rows, and the right eye of the viewer can see the odd number sub-pixel rows, so that the viewer can see a 3D image based on a viewing time difference between both eyes.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The preferred embodiments of the present invention will be described with reference to the accompanying drawings.

Figure 5A:
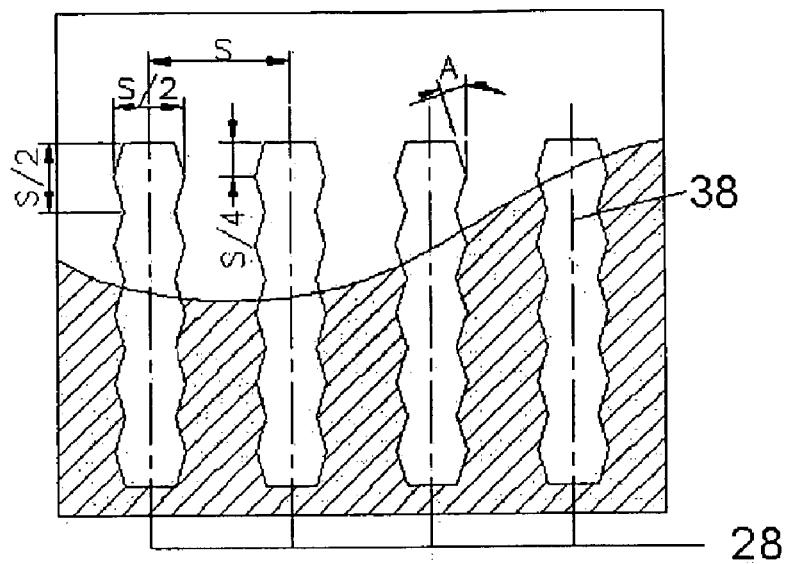
FIGS. 5A and 5B are views illustrating parallax barrier patterns according to the present invention.
Figure 5B:
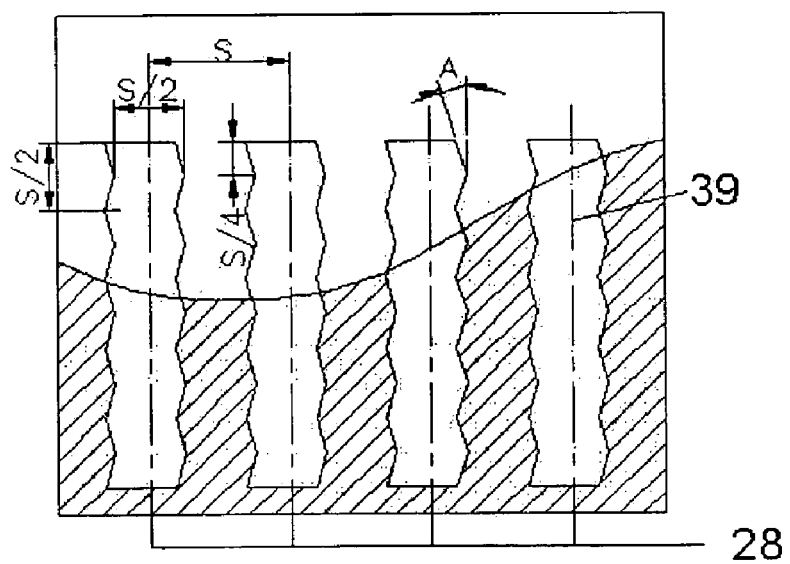
Figure 6:
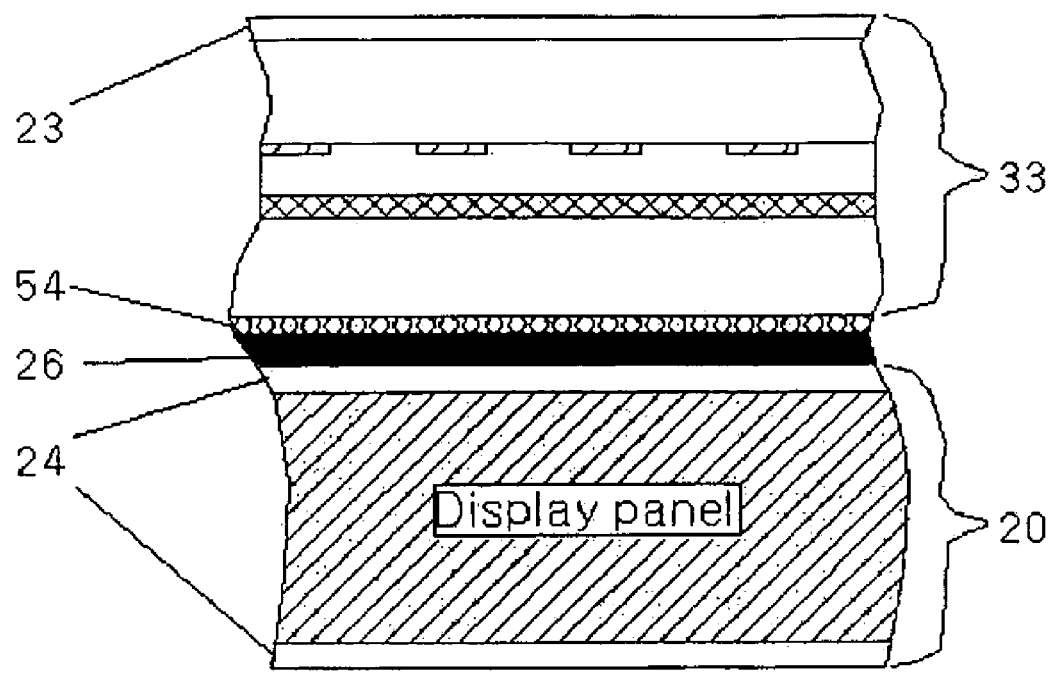
FIG. 6 is a cross sectional view illustrating an assembling of a parallax barrier method according to the present invention.

FIGS. 5A and 5B are views illustrating parallax barrier patterns according to the present invention, and FIG. 6 is a cross sectional view illustrating an assembling of a parallax barrier method according to the present invention.

Figure 1:
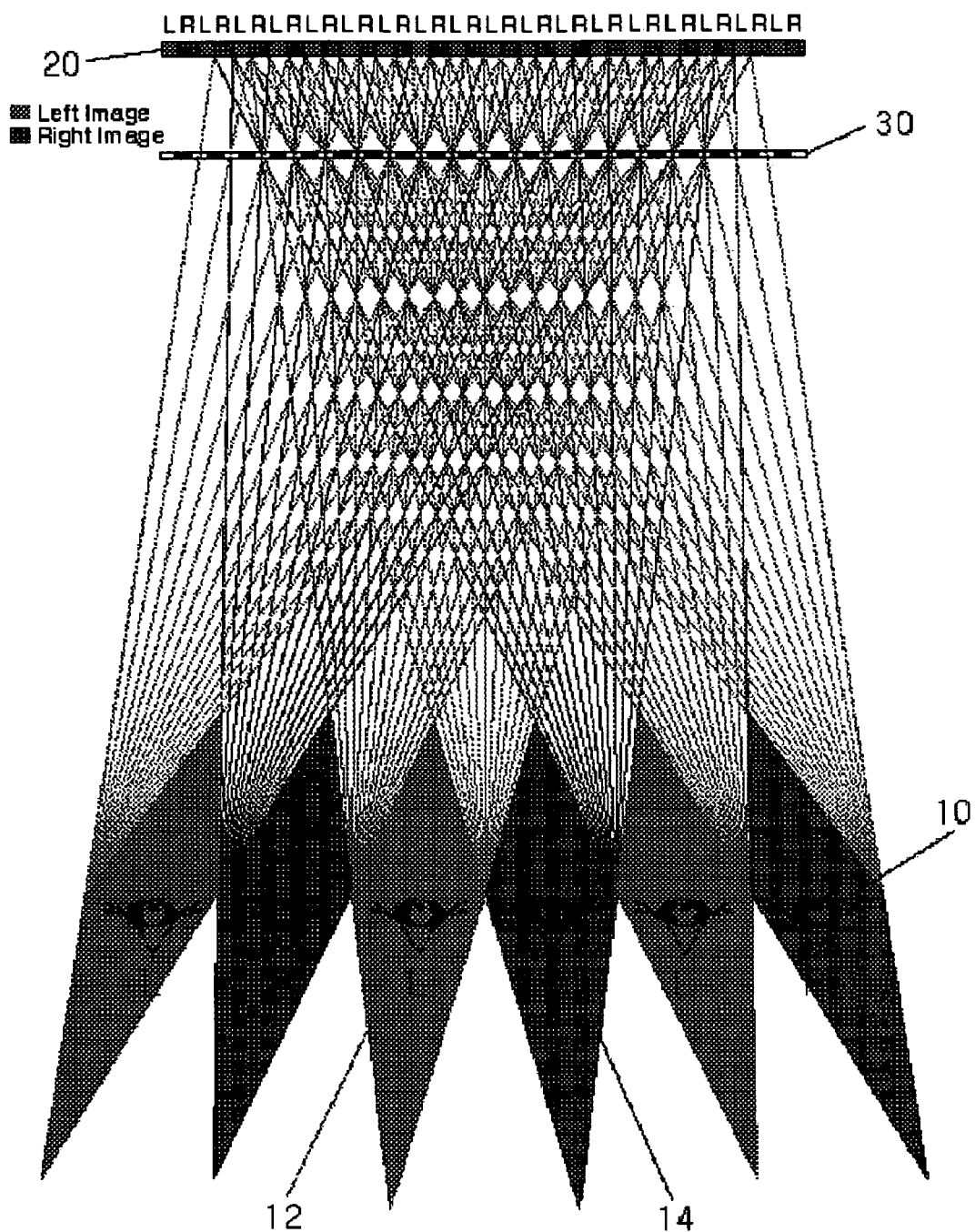
FIG. 1 is a view for describing a parallax barrier method.
Figure 2A:
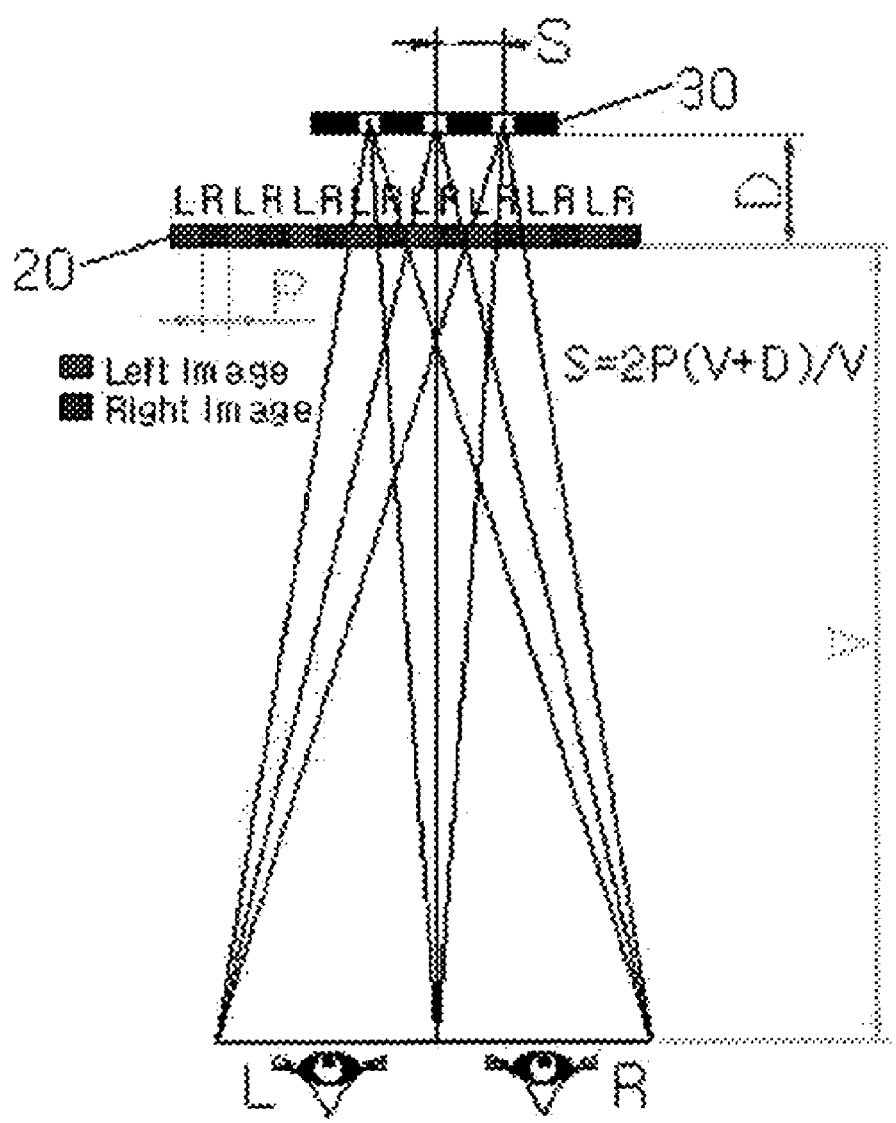
FIGS. 2A and 2B are views for describing a pitch computation formula of a parallax barrier.
Figure 2B:
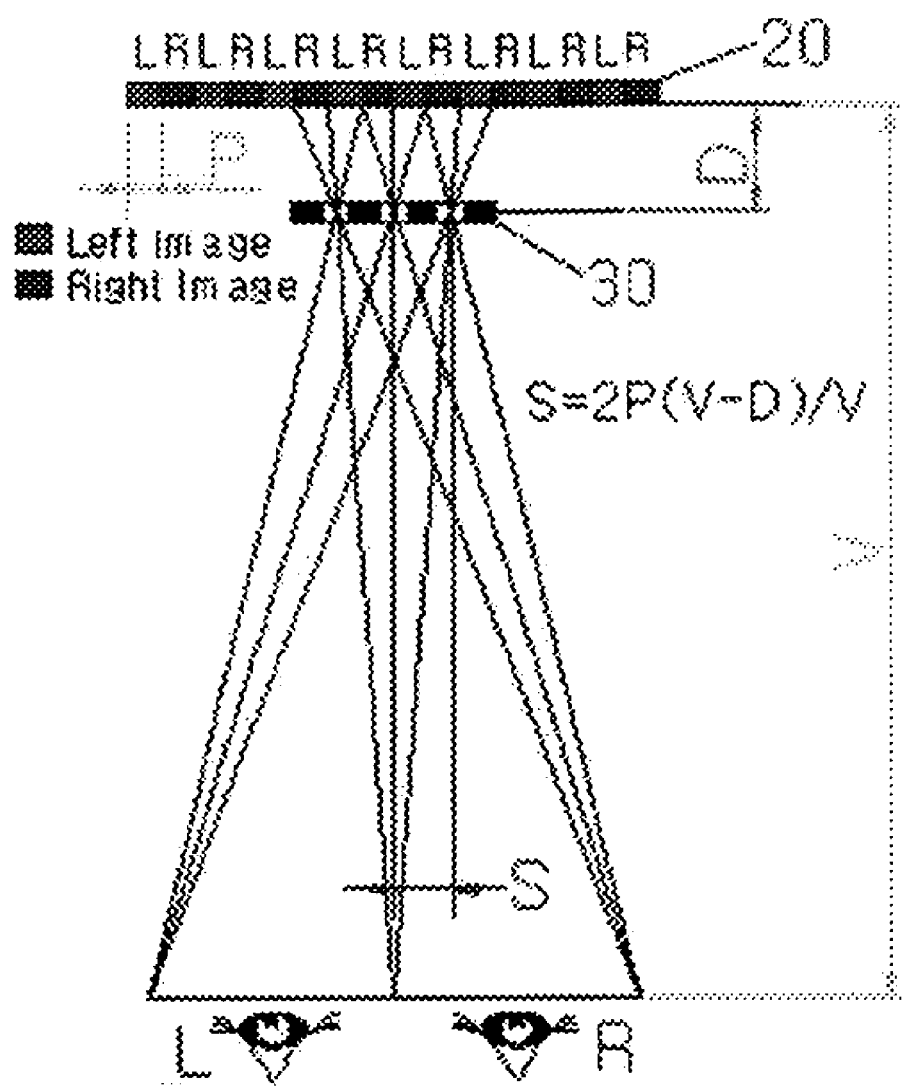
Figure 3A:
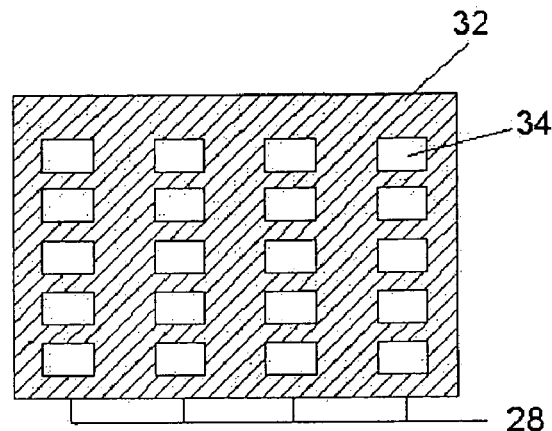
FIGS. 3A, 3B and 3C are views illustrating parallax barrier patterns in a conventional art.
Figure 3B:
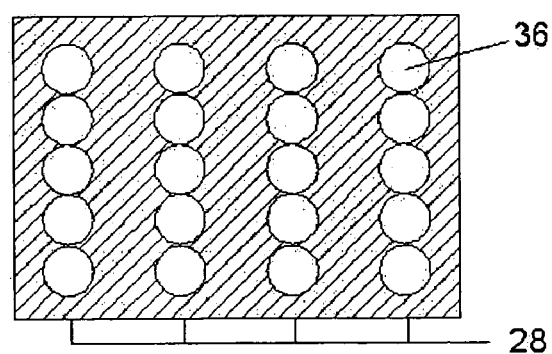
Figure 3C:
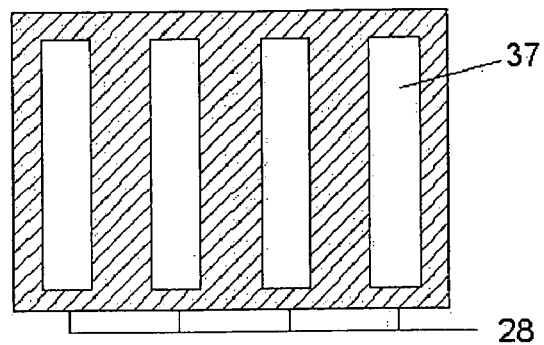
Figure 4:
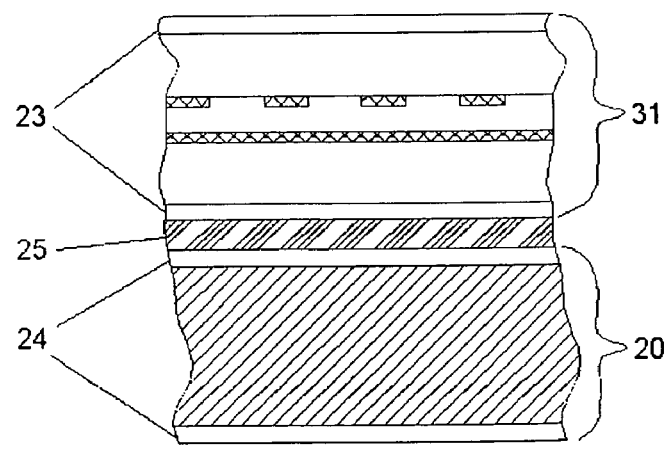
FIG. 4 is a cross sectional view illustrating an assembling of a parallax barrier method in a conventional art.

As shown in FIG. 5A, it is possible to enhance the light transmittance by over 30% as compared to the conventional art in such a manner that the width of the opening is widened with over 45% of the pitches of two corresponding pixels by improving the conventional opening to have a width below ⅓ of pixels. In addition, the shape of the transparent slit is designed to have the shape of FIG. 4A and the tooth shape like the tooth shaped transparent portions 38 and 39. Here, the transparent portion is designed to have ½ of the pitch S and ½ of the pitch S in the upper and lower directions. The angle A of the tooth shape is slanted at an angle of about 10~15° as shown in FIG. 5A for thereby designing with respect to the upper and lower directions. Therefore, it is possible to enhance the quality of the 3D pattern.

As shown in FIG. 6, the ¼ phase pattern 25 that is a conventional method is not attached. Namely, in this embodiment of the present invention, a TAC film 26 of which the cost is ⅓ of the ¼ phase plate 25 is attached for thereby decreasing the fabrication cost. In addition, when designing the electronic shutter 33 of the parallax barrier according to the present invention, the image panel polarized film 24 provided on the surface of the image panel 20 is shared with the polarized film 23 provided on the back surface of the electronic shutter 33, so that it is possible to decrease the number of the electronic shutter polarized film 23 by one sheet, for thereby further decreasing the fabrication cost. In addition, in the case that the electronic shutter 33 is attached on the image panel 20, a microsphere 54 of 20 micron is coated on the surface of the TAC film 26 attached on the image panel 20, and the electronic shutter 33 is tightly attached for thereby preventing the Newton ring phenomenon. When the parallax is fabricated in the type of the electronic shutter and is turned on and off, it is possible to achieve a stable display of the common image and 3D image screens.

As described above, according to the parallax barrier method according to the present invention, the patterns of the transparent slit portion and the non-transparent portion are designed in a tooth shape. The new formula according to the present invention is adapted to the design of the pitch S of the parallax barrier for thereby achieving a good quality of the 3D image. In addition, in the preferred embodiments of the present invention, the TAC film of which the cost is ⅓ of the ¼ phase plate is attached, and the microsphere of 30 micron is coated on the surface of the TAC film and is tightly attached on the parallax barrier for thereby enhancing the quality of the 3D image and preventing the Newton ring phenomenon. Therefore, it is possible to achieve stable common image and 3D image screens. In addition, the polarized film of the back surface of the parallax barrier is removed, and the polarized film is co-used on the front surface of the image panel for thereby decreasing the fabrication cost and achieving a good quality of the 3D image.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A 3-dimensional (3D) image display apparatus for viewing a 3D image comprising:

an image panel comprising a plurality of pixels disposed in a horizontal direction, each pixel comprising sub-pixels R and L disposed in the horizontal direction; and a parallax barrier comprising a plurality of transparent slits formed in a tooth shape, wherein the tooth shape comprises a plurality of straight portions, the tooth shape being symmetrical in upper and lower directions with a width of about ½ of S and a pitch of about ½ of S in the upper and lower directions, and the plurality of straight portions are slanted at an angle of about 10~15 degrees from a line parallel to the upper and lower direction, wherein in the case that the parallax barrier is provided behind the image panel, the pitch of the parallax barrier is $S=2Pk(V+D)/V$, and in the case that the parallax barrier is provided in front of the image panel, the pitch of the same is $S=2Ph(V-D)V$, where S is a slit pitch in a horizontal direction, and P is a pitch of the sub-pixels R and L in a horizontal direction, and V is a distance from the sub-pixels R and L to a viewer, and D is a distance from the sub-pixels R and L to the parallax barrier, and wherein k is a constant value having a range of $0.98<k<1.00$, and h is a constant value having a range of $1.00<h<1.02$.

2. The apparatus of claim 1, further comprising a microsphere layer between the image panel and the parallax barrier, wherein said microsphere layer is coated with a thickness of 20 or 30 micron.

3. The apparatus of claim 1, wherein the width of the opening of said transparent slit in the horizontal direction is over 45% of two pixel pitches of the imagepanel.

4. The apparatus of claim 1, wherein the parallax barrier comprises a plurality of electronic shutter type slits performing on and off operation.

* * * * *